Aug. 8, 1950     H. J. WAHLERS     2,518,101
WRAPPING MACHINE FOR COMESTIBLES MOUNTED ON A STICK
Filed Jan. 28, 1949     7 Sheets-Sheet 1
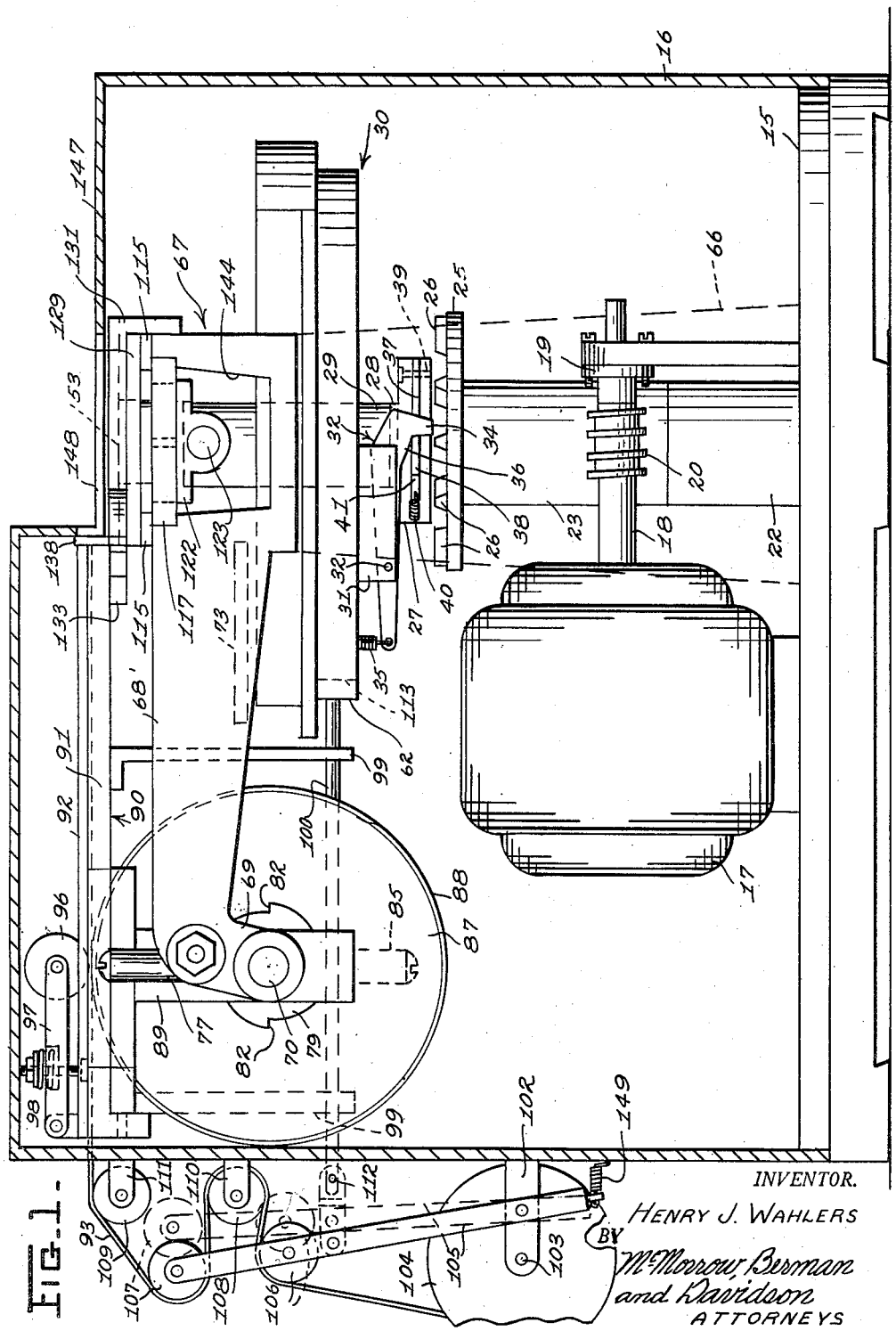
INVENTOR.
HENRY J. WAHLERS
BY McMorrow, Berman and Davidson
ATTORNEYS

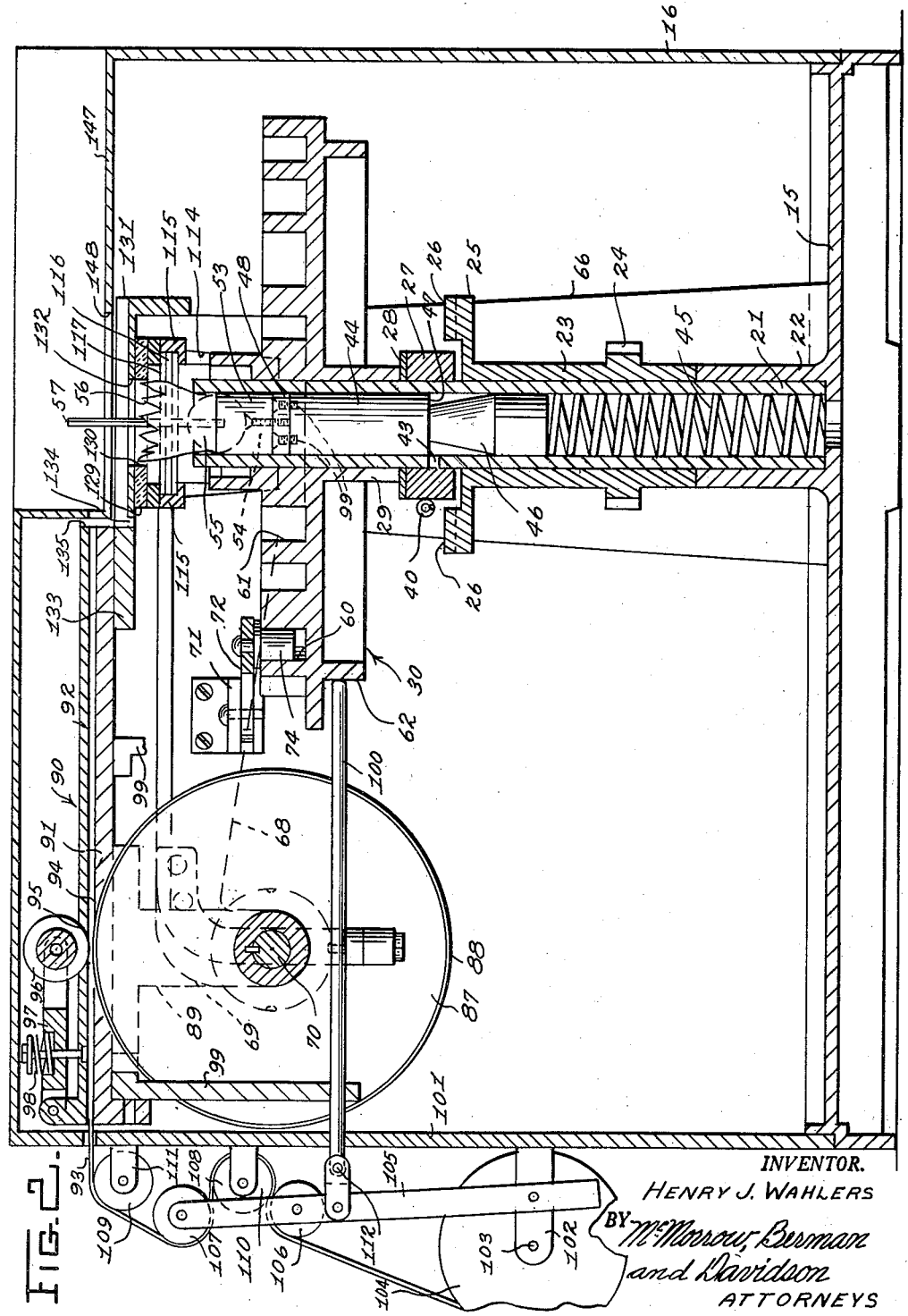

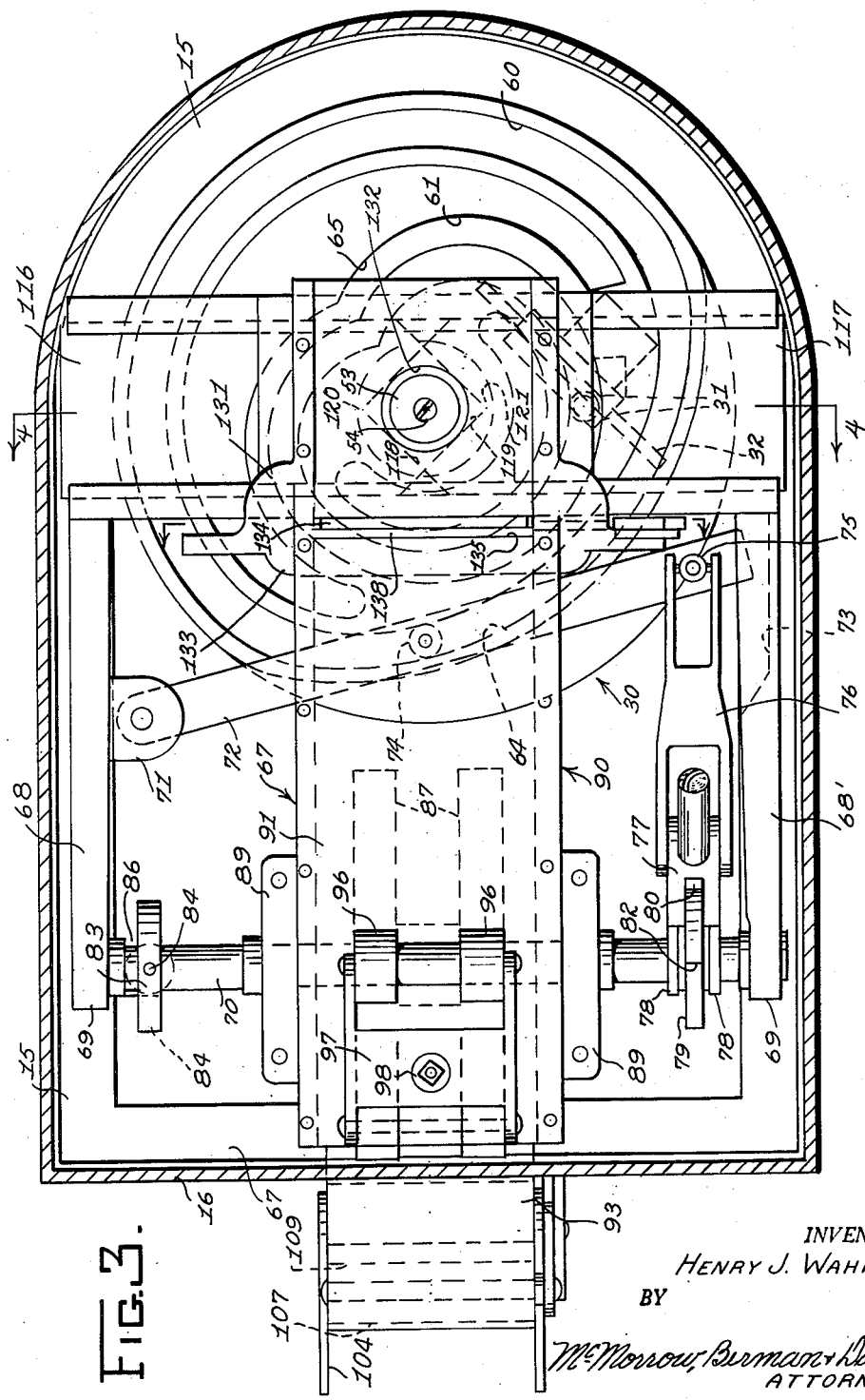

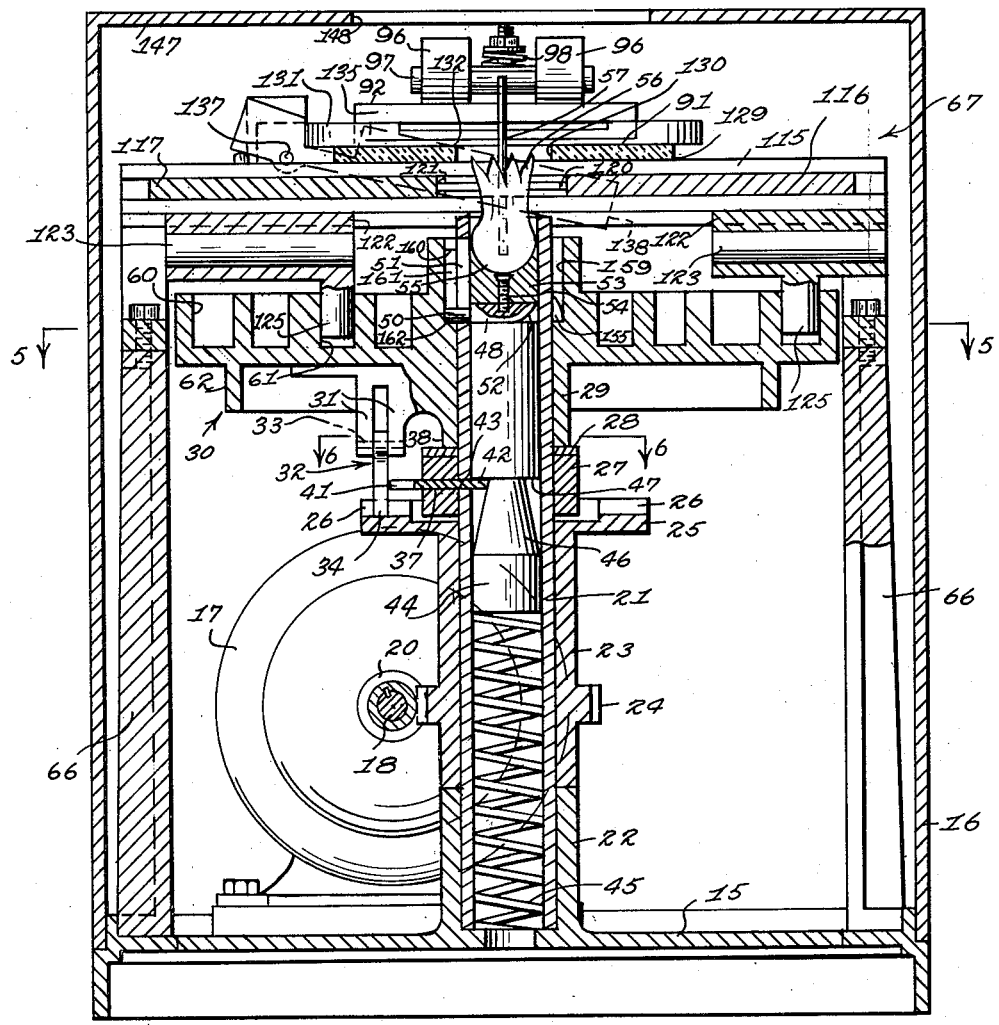

Aug. 8, 1950     H. J. WAHLERS     2,518,101
WRAPPING MACHINE FOR COMESTIBLES MOUNTED ON A STICK
Filed Jan. 28, 1949     7 Sheets-Sheet 5
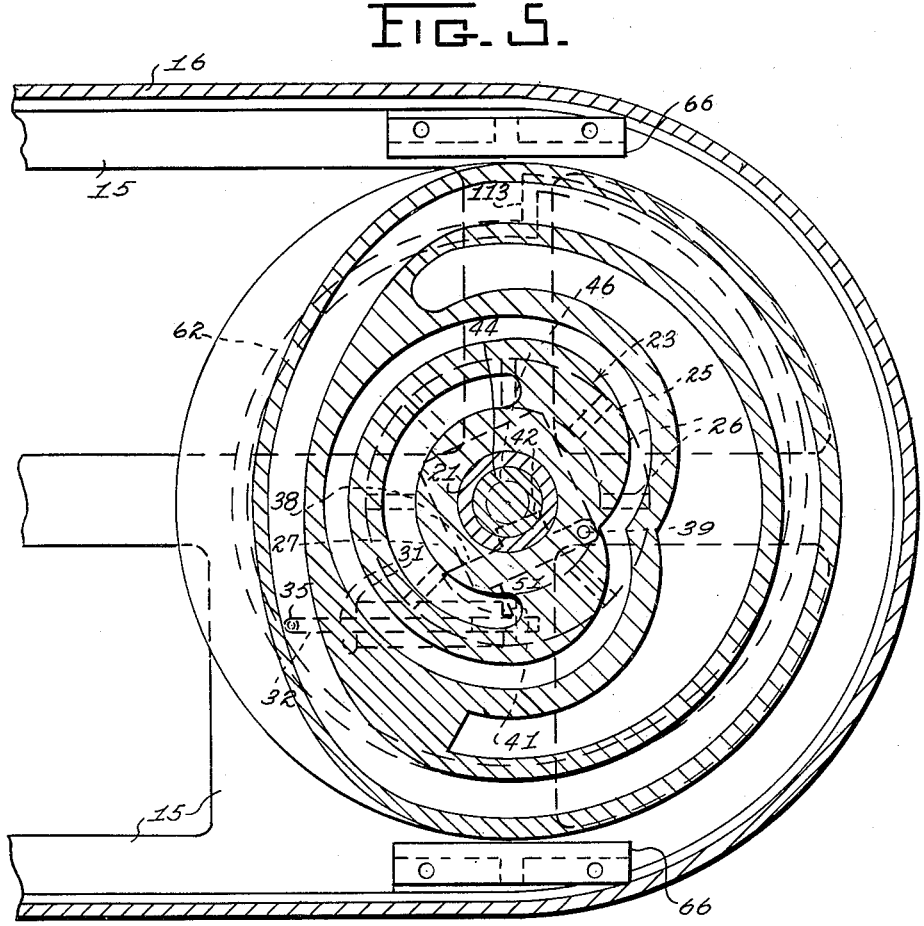
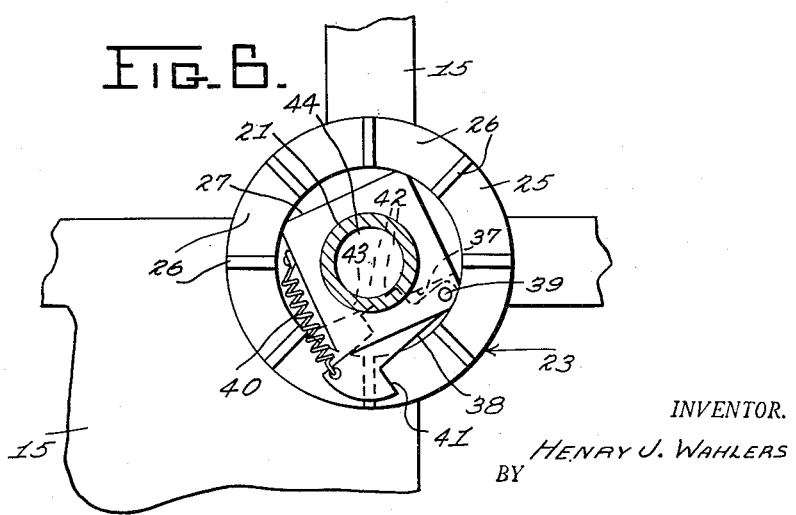
INVENTOR.
HENRY J. WAHLERS
BY
McMorrow, Berman + Davidson
ATTORNEYS Aug. 8, 1950 H. J. WAHLERS 2,518,101
WRAPPING MACHINE FOR COMESTIBLES MOUNTED ON A STICK
Filed Jan. 28, 1949 7 Sheets-Sheet 6

INVENTOR.
HENRY J. WAHLERS
BY
McMorrow, Berman + Davidson
ATTORNEYS

Aug. 8, 1950        H. J. WAHLERS        2,518,101
WRAPPING MACHINE FOR COMESTIBLES MOUNTED ON A STICK
Filed Jan. 28, 1949        7 Sheets-Sheet 7
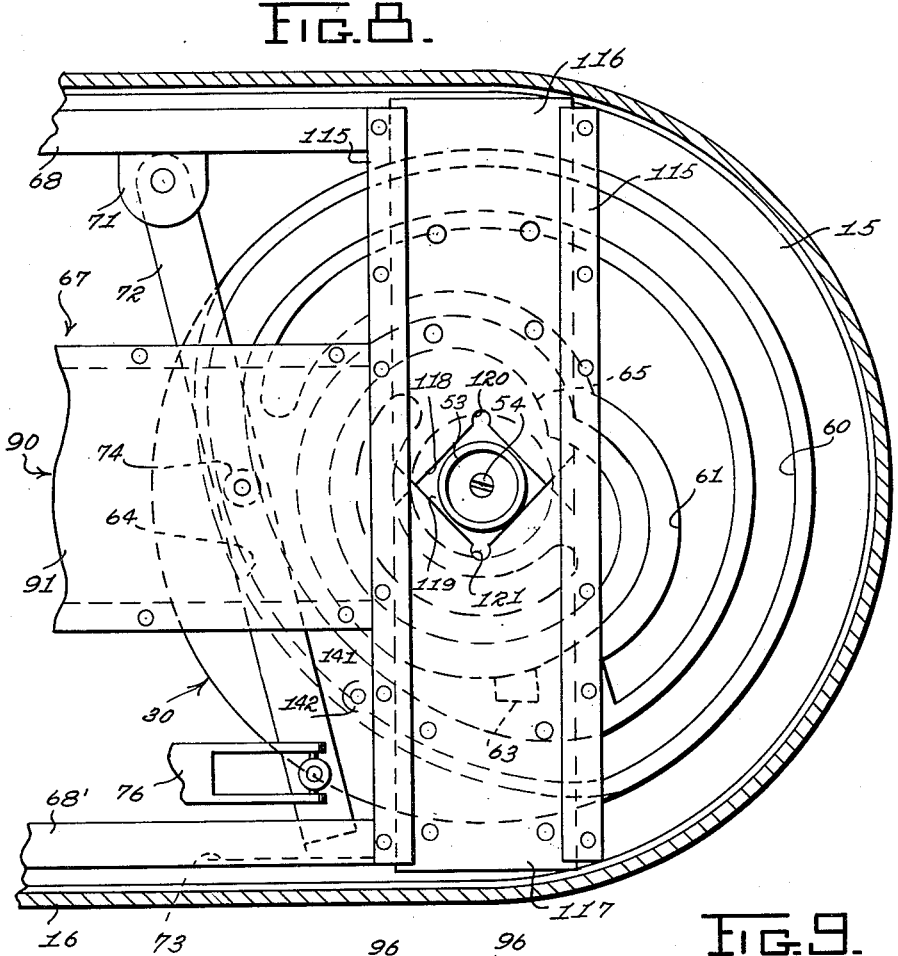
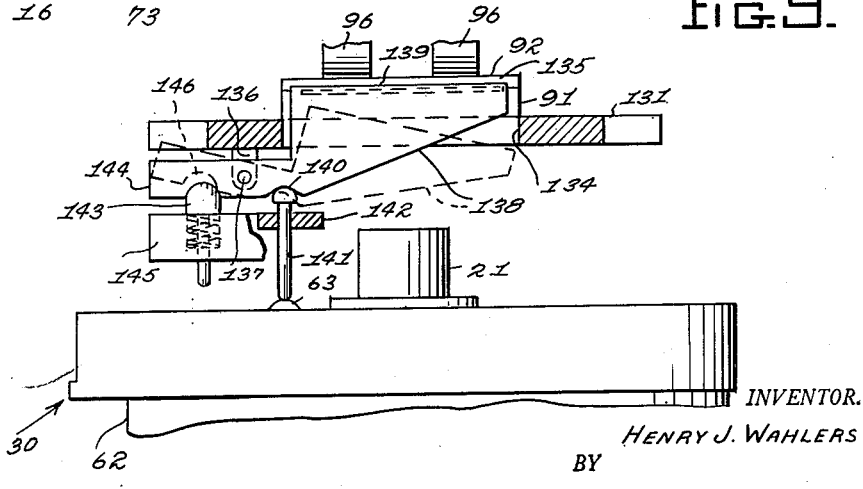
INVENTOR.
HENRY J. WAHLERS
BY
McMorrow, Berman + Davidson
ATTORNEYS Patented Aug. 8, 1950

2,518,101

UNITED STATES PATENT OFFICE 2,518,101

WRAPPING MACHINE FOR COMESTIBLES MOUNTED ON STICKS

Henry J. Wahlers, Bloomfield, N. J.

Application January 28, 1949, Serial No. 73,298

12 Claims. (Cl. 93—5)

My invention relates to wrapping machines for comestibles, and more particularly to wrapping machines for that type of comestible which is mounted upon a stick. Thus, although the machine to be described hereinafter is specifically adaptable for the wrapping of the confection known as a lollipop, it is obviously readily adaptable for the wrapping of other types of stick-mounted comestibles.

With the foregoing in view, it is an object of my invention to provide an improved machine for the wrapping of stick-mounted comestibles.

A further object is to provide such a wrapping machine wherein the wrapper is formed of heat-sealable material and wherein means are provided for heat-sealing the wrapper about the comestible and adjacent portions of the stick.

A further object is to provide in a machine for wrapping stick-mounted comestibles novel means for actuating wrapper-compressing jaws through successive cycles of operation wherein the jaws successively compress a wrapper about the mounting stick and thereafter release the same to permit withdrawal of the wrapped comestible from between the jaws.

A further object is to provide a novel wrapping machine such as that last described wherein the successive cycles are initiated by the act of inserting the comestible between the jaws, and wherein means are provided for accomplishing this function.

A further object is to provide a machine such as that last described, wherein the means initiating the cycles includes means movable by the comestible upon insertion of the same between the jaws and which means are operative to couple jaw-actuating means to a constantly-driven power means to initiate a cycle, together with means for uncoupling said power means from said jaw-actuating means upon the completion of each cycle.

A further object is to provide in a machine such as that last described means for feeding a wrapper strip across said jaws, means for severing a wrapper from said strip and means operatively coupling said wrapper feed and wrapper-severing means to said actuating means for said jaws, whereby to actuate said feed and severing means at appropriate points in each cycle.

Other objects and advantages reside in the particular structure of the invention, the structure of the several elements forming the same, combination and sub-combination of said elements, and/or in the particular method or mode of operation, all of which will be readily apparent to those skilled in the art upon reference to the attached drawing in connection with the following specification, wherein the invention is shown, described and claimed.

In the drawings:

Figure 1 is an elevational view of the machine according to the invention, the frame being shown in longitudinal vertical section;

Figure 2 is a longitudinal vertical sectional view through the machine according to the invention;

Figure 3 is a plan view of the machine, the frame or housing being shown in horizontal section;

Figure 4 is a transverse vertical sectional view taken substantially on the plane of the line 4—4 of Figure 3;

Figure 5 is a fragmentary horizontal sectional view taken substantially on the plane of the line 5—5 of Figure 4;

Figure 6 is a fragmentary horizontal sectional view taken substantially on the plane of the line 6—6 of Figure 4, parts being omitted;

Figure 8 is a fragmentary plan view of a portion of the machine, parts being omitted and parts being shown in horizontal section;

Figure 9 is a fragmentary transverse vertical sectional view taken substantially on the plane of the line 9—9 of Figure 3;

Figure 12 is a wiring diagram showing the power circuit for the device;

Figure 13 is a wiring diagram showing the heating circuit for the device.

Figure 7:
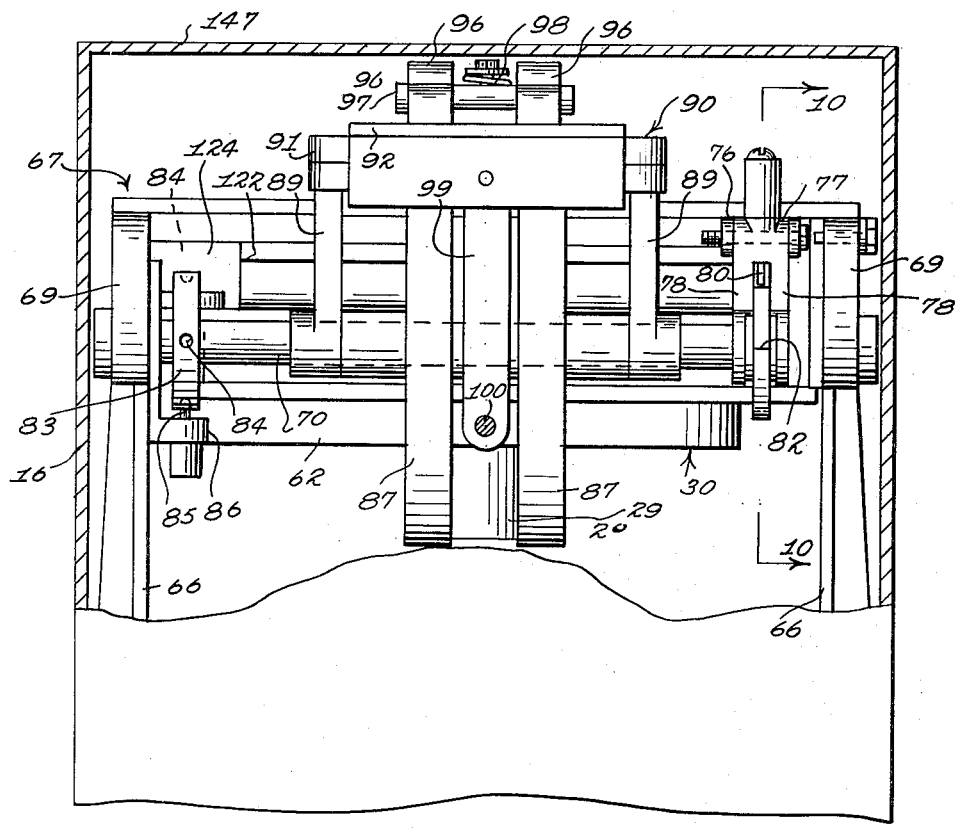
Figure 7 is a fragmentary rear elevation of the machine, parts of the casing being broken away and shown in transverse vertical section.

Referring specifically to the drawings, wherein like reference characters have been used throughout the several views to designate like parts, the machine according to the invention includes a frame having any suitable base or bed 15 and any suitable housing 16 detachably secured to the base for substantially enclosing the working parts of the device. The bed or base 15 has mounted thereon an electric motor 17 provided with a drive shaft 18. The free end of the drive shaft 18 is journaled in any suitable bearing 19 supported on the base 15. Also, the drive shaft is provided with any suitable power-transmitting means, such as the worm 20. A tubular pedestal 21 is fixed to the base and extends vertically thereof. The pedestal 21 is mounted on the bed 15 by being inserted in an upwardly-directed socket 22 which may be formed integrally with the bed. The pedestal 21 provides a bearing for a tubular rotor 23 journaled thereon, the abutting edges of the rotor 23 and socket 22 providing a thrust bearing for the rotor. The lower portion of the rotor 23 is formed to provide a worm gear 24 which is in constant mesh with the worm 20 of the motor shaft 18, whereby to be driven thereby. The upper end of the rotor 23 is formed to provide a disc or radially outwardly-directed annular flange 25, the upper surface of which has an embracing means, such means taking the form of an annular series of latch detents 26. Above the flange 25, the pedestal 21 has rigidly secured thereto in any suitable manner a relatively thick, radially outwardly-directed rectangular flange 27. Any suitable thrust bearing 28 rests atop the flange 27 and provides a thrust bearing for the hub 29 of a rotatable cam journaled on the pedestal 21. The rotatable cam is generally indicated at 30. Means now to be described have been provided for operatively coupling the cam 30 to the rotor 23.

Thus, the under surface of the cam 30, as best seen in Figure 4, is formed with a pair of spaced and parallel ears 31 between which a depending element or latch dog 32 is pivoted by any suitable pivot pin or the like 33. The forward end of the latch dog 32 is formed with a depending tooth 34 adapted to engage at times with one of the detents 26 of the rotor 23. The rear end of the latch dog 32 is secured to a compressive spring 35 carried by the cam 30, whereby to load the tooth 34 in a detent-engaging direction. Rearwardly of the tooth 34, the latch dog 32 is provided with a downwardly-inclined cam surface 36 for a purpose to be apparent hereinafter. The flange 27 is formed with a horizontal slot in which is pivoted one end of a latch lifter 38 by any suitable pivot pin 39 extending downwardly through the flange 27. A compressive spring 40 is secured to the opposite end of the lifter 38 and to the flange 27, whereby to load the lifter 38 to a retracted position out of engagement with the latch dog 32. However, the free end of the lifter 38 is provided with a laterally-directed tooth 41 adapted, when the lifter is in a projected position as will appear hereinafter, to engage the cam surface 36 of the latch dog 32, whereby to elevate the tooth 34 out of engagement with the detents 26 so as to uncouple the cam 30 from the rotor 23. Obviously, with the tooth 34 engaged with one of the detents 26, the rotor 23 and cam 30 are coupled for rotation as a unit.

The rear edge of the lifter 38 is formed with a radially inwardly-directed cam follower 42 adapted at times to project through a slot 43 formed in the pedestal 21 into the interior of such pedestal. This structure is best seen in Figure 6. As best seen in Figures 2 and 4, a plunger 44 is vertically reciprocable in the pedestal 21. The lower end of the plunger 44 is supported upon an expansive coil spring 45 disposed in the pedestal 21 below the plunger. A lower portion of the plunger 44 is formed with a substantially frusto-conical cam surface 46 terminating at the upper end with an annular, downwardly-directed shoulder 47 adapted at times to rest atop the cam follower 42 of the latch lifter 38. Thus, downward movement of the plunger 44 is limited by the cam follower 42. At the same time, it is obvious from Figures 2 and 4 that upward movement of the plunger 44 in the pedestal 21 will cause the cam surface 46 of the plunger to engage the cam follower 42 of the latch lifter, whereby the latch lifter is cammed radially outwardly of the pedestal 21 so as to position the tooth 41 in the path of the cam surface 36 of the latch dog 32, whereby to lift the same upon engagement of the cam surface with the tooth. On the other hand, when the plunger is in the elevated position shown in Figures 2 and 4, it is obvious that the spring 40 is operative to load the latch lifter 38 radially inwardly out of the path of the latch dog 32.

As best seen in Figures 2 and 4, the upper end of the plunger 44 has secured thereto a disc 48 of like diameter. The disc 48 is secured to the plunger in any suitable manner, as by the set screws 49, Figure 2. The disc 48 is formed with an integral radially outwardly-extending cam follower in the form of a cylindrical pin 50 which extends through a vertical slot 51 formed in the pedestal 21 adjacent the upper end thereof. An edge surface of the disc 48 opposite the follower 50 is rounded or undercut, as indicated at 52, Figure 4, to facilitate the insertion of the same in the pedestal 21 for attachment to the plunger 44. A cylindrical cup-shaped socket 53 having substantially the same diameter as the plunger 44 and disc 48 is secured atop the disc 48 in any suitable manner, as by the set screw 54. The cupped upper end of the socket 53 is adapted to receive therein any suitable comestible 55 together with portions of the wrapper 56 therefor and adjacent portions of a stick 57 mounting the comestible.

The cam 30 has an upper surface formed with a pair of upwardly-directed, closed cam tracks 60 and 61. The cam track 60 is the outer track and the track 61 is an inner track. Also, a lower portion of the cam 30 is formed with a radial cam surface 62. Moreover, and as best seen in Figures 8 and 9, an upper portion of the cam 30 is formed with a cam lift 63. The purpose of all of these elements will be apparent hereinafter. Also, it should be noted that substantially one-half of each of the cam tracks 60 and 61 are semi-circular and concentrically disposed about the axis of the pedestal 21. Moreover, such semi-circular portions of the cam tracks 60 and 61 are oppositely disposed relative to each other. The opposite end portions of the semi-circular portion of the track 61 are connected together by a flattened track portion 64, while the opposite ends of the semi-circular portion of the track 61 are connected by a similar flattened portion 65. Thus, the central portions of the flattened cam track portions 64 and 65 approach closer to the axis of rotation of the cam than do the semi-circular portions of such tracks. The purpose of this structure will be apparent hereinafter.

Figure 10:
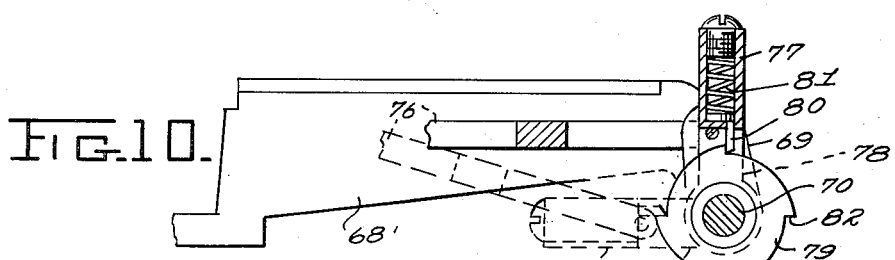
Figure 10 is a longitudinal vertical sectional view taken substantially on the plane of the line 10—10 of Figure 7.
Figure 11:
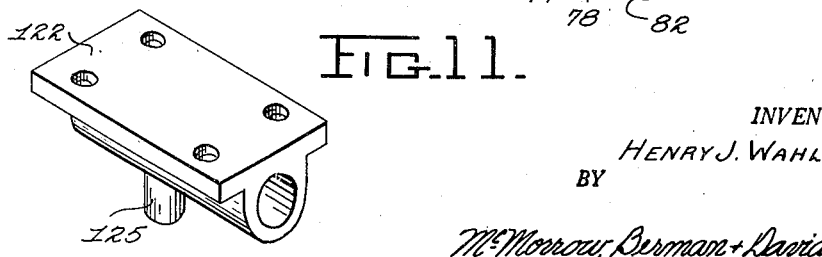
Figure 11 is a perspective view of the heater element for the device apart from the rest of the structure.

A pair of laterally-spaced uprights 66 are secured to opposite sides of the base or bed 15 adjacent the forward end thereof. A horizontal superstructure, generally indicated at 67, is secured to the upper ends of the uprights 66. The superstructure 67 includes a pair of laterally-spaced and aligned, rearwardly-directed bracket arms 68, 68' the rear ends of which are downwardly turned and formed to provide journals for a cross-shaft 70. The bracket arm 68 has mounted thereon intermediate the ends thereof any suitable means, such as the vertically-spaced ears 71 between which is pivoted the adjacent end of a cross-lever 72 extending horizontally across the superstructure. The free end of the lever 72 is slidably received and supported in a slot 73 formed in the other bracket arm 68'. An intermediate portion of the cross-lever 72 has pivoted thereto a cam follower or roller 74 which is received in the outermost cam track 60. Also, the free end of the cross-lever 72 inwardly of the bracket arm 68' is universally connected by any suitable universal connection 75 to the forward end of a drag link 76. The rear end of the drag link 76 is bifurcated and pivotally connected to a yoke 77. The legs 78 of the yoke are journaled on the cross-shaft 70 in straddling relation to a ratchet wheel 79 fixed to such shaft. The yoke 77 is provided with a pawl 80 loaded by a spring 81 for engagement with the teeth 82 of the ratchet wheel 79. It follows from the foregoing that each rotation of the cam 30 will rock the cross-lever 72 back and forth, whereby to reciprocate the drag link 76 forwardly and rearwardly relative to the machine. This action causes the yoke 77 to be moved from the full line position, Figure 10, to the broken line position in a counter-clockwise direction, causing a partial rotation of the ratchet wheel 79. As the ratchet wheel 79 is fixed to the cross-shaft 70, such action causes a partial rotation of the shaft 70. Obviously, return movement of the drag link and yoke is ineffective to rotate the shaft as the spring-loaded pawl 80 will ride over the ratchet teeth 82 and seat behind a ratchet tooth ready for the next reciprocation of the drag link 76.

A latch wheel 83 is fixed to the shaft 70 adjacent the bracket arm 68. The periphery of the latch wheel 83 is formed with a plurality of spaced latch detents 84 which are preferably so positioned as to be aligned with the ratchet teeth 82 of the ratchet wheel 79. Such detents 84 are adapted to be engaged by a ball latch 85 which is loaded for engagement therewith by spring means, not shown, in a well known manner. The latch 85 is mounted on any suitable bracket 86 secured to the bracket arm 68. Thus, each rotation of the shaft 70 by the pawl 80 is prevented from overrunning by the re-engagement of the ball latch 85 in the next detent 84. The arrangement is such that on each return stroke of the drag link 76 and yoke 77, the pawl 80 will be seated behind the next ratchet tooth 82 without any lost motion being present for the next forward stroke. While the embodiment illustrated shows four ratchet teeth 82 and four detents 84 each spaced 90° apart about their ratchet and latch wheels, it is obvious that any number of ratchet teeth and detents could be utilized.

A pair of laterally-spaced wrapper strip feed wheels 87 are fixed to the shaft 70 in laterally-spaced relation centrally of the shaft. Preferably, the wheels 87 are provided with friction tires 88 of rubber-like material. Outwardly of the wheels 87, the shaft 70 has journaled thereon the lower ends of a pair of laterally-spaced legs 89 for a platform 90. The platform 90 comprises a floor plate 91 and a cover plate 92 secured to the floor plate in slightly vertically-spaced relation to provide a trough for the passage along the top of the floor plate of a wrapper strip 93. Likewise, the rear end of the floor plate 91 is formed with parallel slots 94, Figure 2, to permit the passage of the peripheries of the wheels 87 therethrough to a point slightly above the plane of the upper surface of the floor plate so as to frictionally engage the under surface of the wrapper strip 93. The cover plate 92 is also formed with a pair of slots 95 and in vertical alignment with the slots 94, whereby to permit the passage therethrough of a pair of laterally-spaced follower rolls 96. The rolls 96 are mounted on a yoke 97 pivoted to the cover plate 92 and loaded for engagement with the periphery or upper surface of the strip 93 by an expansive spring 98.

A pair of guides 99 depend from the floor plate 91 forwardly and rearwardly of the shaft 70 and slidably mount a push rod 100 therein. The push rod 100 extends between the wheels 87 and has a forward end providing a cam follower riding on the radial cam 62 of the cam 30. The rear end of the rod 100 is slidable through the rear wall 101 of the casing 16. The rear wall 101 of the casing has mounted thereon a pair of laterally-spaced ears 102 mounting a spindle 103 therebetween for a spool 104 for a roll of the wrapper strip 93. Likewise, the ears 102 have pivotally connected thereto on opposite sides of the spool 104 a pair of upwardly-directed stripper legs 105. The legs 105 have pivoted therebetween upper and lower stripper rolls 107 and 106, respectively, in vertically-spaced relation. Also, the rear surface of the rear wall 101 has pivoted thereon a pair of fixed stripper rolls 108 and 109 which are pivotally mounted between spaced ears 110 and 111, respectively. The rolls are so spaced that the stationary stripper roll 108 is located between the swingable stripper rolls 106 and 107, while the latter roll is between the stationary stripper rolls 108 and 109. As clearly seen in Figures 1 and 2, the wrapper strip 93 is threaded over the lowermost movable stripper roll 106 under the lower stationary stripper roll 108, rearwardly over the upper movable stripper roll 107, and thereafter forwardly over the uppermost stationary stripper roller 108. Likewise, it should be noted that the rear end of the rod 100 is pivotally connected to one of the legs 105 by any suitable pivot means 112. It follows from the foregoing that upon rotation of the cam 30, the rod 100 will be gradually pushed rearwardly carrying with it the movable stripper rolls 106 and 107, whereby to strip a short length of the wrapper strip 93 from the spool 104. Rearward pulling of the strip 93 from between the rolls 87 and 96 is prevented by the frictional grip of the tires 88 with the strip. At the same time, as soon as the front end of the rod 100 clears the cam lift 113, Figure 5, of the cam surface 62, pressure is relieved on the rod 100 and the same is permitted to ride forward as the feed wheels 87 are rotated.

In this connection, it should be noted that the timing of the device is such that the shaft 70 is not rocked in a wrapper-feeding direction until just after the front end of the push rod 100 has cleared the cam lift 113. The effect of this arrangement is to impose but substantially little resistance on the strip 93 upon feeding movement imparted thereto by the feed wheels 87. Thus, at each partial rotation of the shaft 79, a portion of the strip 93 is fed forward through the trough provided between the base plate 91 and cover plate 92 of the platform 90. Obviously, a like length of the strip 93 will be fed forwardly at each actuation of the wheels 87.

The forward upper ends of the bracket arms 68 and 68' are notched, as at 114, to support a pair of spaced transverse tracks 115. The tracks 115 have mounted therein sliding jaws 116 and 117. The facing ends of the jaws 116 and 117 are formed with opposed V-shaped notches 118 and 119, respectively, the apices 120 and 121 thereof being further recessed to provide arcuate recesses adapted to receive the stick 57 therein, as will appear later. Moreover, the facing ends of the jaws 116 and 117 are formed to interfit with each other in a manner substantially similar to the similar jaws shown in the patent to G. E. Kaeding and Hans Hoyer, No. 2,185,593, dated January 2, 1940. The jaws 116 and 117 are preferably formed of heat-conducting material for a purpose to be apparent hereinafter. The jaws 116 and 117 are disposed slightly above the uppermost plane of the column or pedestal 21 and the jaws are adapted to open and close above the top of the pedestal upon reciprocation of the jaws in opposite directions. Also, the jaws are disposed slightly below the plane of the upper surface of the base plate 91 of the platform 92, whereby a wrapper 93 may be readily fed across the jaws in a manner to be described hereinafter. The under surfaces of the jaws 116 and 117 have secured thereto in any suitable manner for ready detachment casings 122 of heat-conducting material. The casings 122 are provided with tubular bores for the reception therein of electric heating elements 123 of the cartridge type. The heating elements are supplied with electric current by any suitable cables 124, it being understood that the cables are sufficiently long to prevent ready reciprocation of the housings 122 with the jaws. Also, the housings 122 include depending cam followers 125. One of the followers 125 is received in the cam track 60, while the other follower is received in the cam track 61. As best seen in Figure 13, the heating elements 123 may be connected together in series by any suitable lead 126. Also, it is understood that the temperature of the heating elements 123 may be controlled by any suitable and/or well known form of thermostat 127. Additionally, the flow of current to both heating elements 123 is preferably controlled by a single switch or like circuit breaker 128.

A heat-insulating plate 129 is supported atop the tracks 115 in overlying relation to the pedestal 21. Also, a hole 130 is formed through the plate 129 coaxially of the pedestal 21. A plate 131 is secured atop the insulating plate 129 and is likewise formed with a hole 132 coaxially with the hole 130 and pedestal 21. Also, Figure 2, the plate 131 includes a rearwardly-directed portion 133 extending below the platform 90 to support the forward end thereof. As best seen in Figure 9, the plate 131 is formed with a transverse slot 134, the rear edge of which is substantially flush with the forward edges of the base plate 91 and cover plate 92. Also, the plate 131 is formed with a depending ear 136 to which is pivoted by any suitable pivot means 137 a movable shear blade 138. The cutting edge 139 of the blade 138 cooperates with the forward end edge 135 of the cover plate 92 to provide a shear for shearing off wrapper portions from the wrapper strip 93. Between the blade 138 and the pivot 137, the under edge of the blade is formed with a notch 140 seating the head of a pin 141. The pin 141 is vertically slidable in an ear 142 extending rearwardly of the rearmost track 115 and mounted thereon. The lower ends of the pin 141 comprises a cam follower adapted to engage the cam lift 63 on the cam 30. In the embodiment illustrated, at one time during each revolution of the cam 30, the lift 63 engages the pin 141, whereby to actuate the knife blade 138 through a shearing operation relative to the stationary blade 135. At other times, the blade 138 is retracted by gravity to permit free passage of the wrapper strip 93 through the open front ends of the passage provided by the cover plate 92 and the base plate 91. If desired, however, a spring-loaded plunger 143 may engage a portion of the handle 144 of the blade to load the same to the inoperative position. The plunger 143 is mounted in any suitable bracket 145 secured to any convenient part of the superstructure 67. If desired, the handle 144 of the blade may be notched, as at 146, to receive the head of the plunger 143.

The housing or casing 16 includes a cover plate 147 which is formed with a hole therethrough coaxially disposed relative to the holes 132, 130 and the pedestal 21. Such cover plate may be removed apart from the rest of the housing or may be, as shown, integral with the rest of the housing 16.

As best seen in Figures 12 and 13, the motor 17 is supplied with current through a pair of leads 151 and 152 which are operatively connected to any suitable source by a plug 153. Preferably, a switch 150 is interposed in the lead 151 to control the circuit. Likewise, the heater circuit of Figure 13 is supplied with current by being connected to any suitable source of electric current by means of a plug 154.

In operation, and with the socket 53 in the uppermost position, the switches 150 and 128 are closed in a reverse order so that the heating elements 123 have time to heat up before the motor 17 is started. When the motor is started, it is assumed that a cycle of operation has ended, whereby a wrapped comestible has been removed from the machine through the hole 148 and that the cycle has ended by the cam follower 74 being actuated to feed a proper length of wrapper material 93 across the opening or hole 132 formed in the plate 131. Also, the final step of each cycle is the actuation of the knife blade 138 to sever a wrapper portion from the wrapper strip 93. The plunger 44 together with the socket 53 have been lifted to the uppermost position by the engagement of the pin 50 with a cam track 155 of helical nature formed in the hub of the cam 30 concentrically about the upper end of the pedestal 21. The cam 155 terminates in a semi-annular level track 160, of substantially 180°, terminating in a straight drop 161 to a floor 162 having an arc of substantially 90°. Thus, the track 155 is of substantially 90° in length. Thus, at the conclusion of each cycle, the pin 50 is positioned over the straight drop 161 and the plunger is maintained in such uppermost position by the spring 45. A comestible is now inserted into the machine through the holes 148, 132, 130 and between the jaws 116 and 117, so as to rest in the socket 53. Thereafter, the comestible is depressed carrying with it the plunger 44 to the Figure 4 and Figure 2 position. This operation retracts the latch lifter 38, whereby the latch dog 32 drops down and engages a tooth 26 of the rotor 23. This action couples the cam to the rotor 23 and causes rotation of the same. During the first 90° of rotation, the jaws 116 and 117 close and heat-seal those portions of the wrapper 56 overlying the adjacent portion of the stick 57 about the stick adjacent the comestible 55. Simultaneously, the paper feed cam follower 74 is moved from its innermost point to its outermost point for re-engagement with the next tooth of the paper feed roll ratchet. During the second 90° of rotation of the cam 30, the jaws 116 and 117 are retracted to their open positions and the pin 50 engages the cam surface 155, whereby the plunger 44 starts moving upwardly. This operation by virtue of the cam surface 46 initiates upward movement of the latch lifter 38. The third 90° of rotation of the cam 30 finds the jaws 116 and 117 maintained in the retracted positions and the plunger rises to the uppermost position to rest on the surface 160. At the same time, the latch lifter 38 is moved to its outermost position at which point the tooth 41 is in the path of the cam surface 36 of the latch dog 32. At the end of the third 90° of rotation, the stripper carriage has been pushed to its extreme rearmost position by the push rod 109, and the forward end of the same passes over the cam lift 113. During the final 90° of rotation, the cam follower 74 starts moving forwardly in the cam track 60, whereby to pull the drag link 76 forwardly so as to rock the yoke 77 in a counter-clockwise direction, Figure 10, and impart a 90-degree rotation to the shaft 70 and feed roll wheels 87. This is effective to feed a desired wrapper-providing portion outwardly of the platform 90 between the free front ends of the plates 91 and 92. Meanwhile, the cam lift 63 has been approaching the knife-actuating plunger 141 and engages the same to sever the wrapper portion from the strip 93 just prior to the end of the final 90° of rotation of the cam 30. Immediately thereafter, the jaw 41 of the latch lifter engages the cam surface 36 of the latch dog 32 and elevates the latch dog out of engagement with the teeth 26, whereby to uncouple the cam 30 from the rotor 23. Thus, a cycle has been completed leaving the plunger 44 uppermost and a freshly-severed wrapper portion overlying the openings for the socket 53. Cycles may be repeated as fast as an operator for the machine may insert comestibles into the socket 53 and remove the same when they are completely wrapped. At the same time, the machine according to the invention is small and compact, whereby it may be readily used upon a table or counter top simply by being plugged into any convenient source of electric current. Also, by heat-sealing the wrapper about the comestible and the adjacent stick portion, it is unnecessary to provide elaborate mechanical means for tightly twisting the paper or wrapper-providing material about the stick.

Moreover, while I have shown and described what is now thought to be a preferred embodiment of the invention, it is to be unedrstood that the same is susceptible of other forms and expressions. Consequently, I do not limit myself to the precise structure shown and described hereinabove except as hereinafter claimed.

I claim:

1. A wrapping machine for applying a wrapper to a comestible on a stick, comprising a base including a pedestal, a rotor rotatable on said pedestal, means for rotating said rotor, a disc freely rotatably on said pedestal above said rotor and secured to said rotor, embracing means on said disc, a movable cam on said pedestal above said disc, an element dependingly carried by said cam and movable into and out of engagement with said embracing means on said disc to thereby couple and uncouple said rotor to said cam, means biasing said element toward the position of engagement with said embracing means on said disc, movable means on said pedestal intermediate said disc and said cam and engageable with the under surface of said element to thereby lift said element out of engagement with said embracing means and uncouple said rotor and said cam, a pair of movable jaws carried by said base above said cam, said jaws being movable to and from open and closed positions and being adapted in said open position to receive a partially-wrapped comestible and an adjacent portion of the mounting stick therebetween and in said closed position to compress portions of a comestible wrapper about said adjacent stick portion, means operatively coupling said jaws to said cam for a wrapping cycle wherein said jaws are moved from said open position to said closed position and back to said open position in one revolution of said cam with said rotor, means movable automatically in one direction for moving said movable cam to uncouple said cam and rotor at the end of each cycle, and said last-named means being movable in an opposite direction by the insertion of a comestible between said jaws so as to move said element carried by said cam into engagement with the embracing means on said disc whereby to permit said means biasing said element to move the same into said operative position and couple said cam and rotor together for another wrapping cycle.

2. A wrapping machine for wrapping and sealing a heat-sealable wrapper about a comestible and an adjacent portion of a stick mounting the same, comprising a base including a pedestal, a rotor rotatable on said pedestal, means for rotating said rotor and secured to said rotor, embracing means on said disc, a movable cam on said pedestal above said disc, an element dependingly carried by said cam and movable into and out of engagement with said embracing means on said disc to thereby couple and uncouple said rotor to said cam, means biasing said element toward the position of engagement with said embracing means on said disc, movable means on said pedestal intermediate said disc and said cam and engageable with the under surface of said element to thereby lift said element out of engagement with said embracing means and uncouple said rotor and cam, a pair of movable jaws carried by said base above said cam, said jaws being movable to and from open and closed positions and being adapted in said open position to receive a partially-wrapped comestible and an adjacent portion of the mounting stick therebetween and in said closed position to compress portions of a comestible wrapper about said adjacent stick portion, means operatively coupling said jaws to said cam for a wrapping cycle wherein said jaws are moved from said open position to said closed position and back to said open position in one revolution of said cam with said rotor, means movable automatically in one direction for moving said movable cam to uncouple said cam and rotor at the end of each cycle, said last-named means being movable in an opposite direction by the insertion of a comestible between said jaws so as to move said element carried by said cam into engagement with the embracing means on said disc whereby to permit said means biasing said element to move the same into said operative position and couple said cam and rotor together for another wrapping cycle, said wrapper being a heat-sealable wrapper, and means for heating said jaws so as to heat-seal said wrapper portions about said adjacent stick portions when said jaws are in said closed positions.

3. A wrapping machine for applying a wrapper to a comestible on a stick, comprising a base including a pedestal, a rotor rotatable on said pedestal, means for rotating said rotor, a disc freely rotatable on said pedestal above said rotor and secured to said rotor, embracing means on said disc, a movable cam on said pedestal above said disc, an element dependingly carried by said cam and movable into and out of engagement with said embracing means on said disc to thereby couple and uncouple said rotor to said cam, means biasing said element toward the position of engagement with said embracing means on said disc, movable means on said pedestal intermediate said disc and said cam and engageable with the under surface of said element to thereby lift said element out of engagement with said embracing means and uncouple said rotor and said cam, a pair of movable jaws carried by said base above said cam, said jaws being movable to and from open and closed positions and being adapted in said open position to receive a partially-wrapped comestible and an adjacent portion of the mounting stick therebetween and in said closed position to compress portions of a comestible wrapper about said adjacent stick portion, means operatively coupling said jaws to said cam for a wrapping cycle wherein said jaws are moved from said open position to said close position and back to said open position in one revolution of said cam with said rotor, said cam having an upper surface formed with cam tracks, said jaws including depending cam followers operatively engaging said cam tracks, said cam tracks and followers being adapted during each cycle to move both jaws simultaneously into and out of said open and closed positions and at times to maintain said jaws in said open positions, means movable automatically in one direction for moving said movable cam to uncouple said cam and rotor at the end of each cycle, and said last-named means being movable in an opposite direction by the insertion of a comestible between said jaws so as to move said element carried by said cam into engagement with the embracing means on said disc whereby to permit said means biasing said element to move the same into said operative position and couple said cam and rotor together for another wrapping cycle.

4. A wrapping machine for wrapping and sealing a heat-sealable wrapper about a comestible and an adjacent portion of a stick mounting the same, comprising a base including a pedestal, a rotor rotatable on said pedestal, means for rotating said rotor and secured to said rotor, embracing means on said disc, a movable cam on said pedestal above said disc, an element dependingly carried by said cam and movable into and out of engagement with said embracing means on said disc to thereby couple and uncouple said rotor to said cam, means biasing said element toward the position of engagement with said embracing means on said disc, movable means on said pedestal intermediate said disc and said cam and engageable with the under surface of said element to thereby lift said element out of engagement with said embracing means and uncouple said rotor and said cam, a pair of movable jaws carried by said base above said cam, said jaws being movable to and from open and closed positions and being adapted in said open position to receive a partially-wrapped comestible and an adjacent portion of the mounting stick therebetween and in said closed position to compress portions of a comestible wrapper about said adjacent stick portion, means operatively coupling said jaws to said cam for a wrapping cycle wherein said jaws are moved from said open position to said closed position and back to said open position in one revolution of said cam with said rotor, said cam having an upper surface formed with cam tracks, said jaws including depending cam followers operatively engaging said cam tracks, said cam tracks and followers being adapted during each cycle to move both jaws simultaneously into and out of said open and closed positions and at times to maintain said jaws in said open positions, means movable automatically in one direction for moving said movable cam to uncouple said cam and rotor at the end of each cycle, said last-named means being movable in an opposite direction by the insertion of a comestible between said jaws so as to move said element carried by said cam into engagement with the embracing means on said disc whereby to permit said means biasing said element to move the same into said operative position and couple said cam and rotor together for another wrapping cycle, said wrapper being a heat-sealable wrapper, and means for heating said jaws so as to heat-seal said wrapper portions about said adjacent stick portions when said jaws are in said closed positions.

5. A wrapping machine for applying a wrapper to a comestible on a stick, comprising a base including a pedestal, a rotor rotatable on said pedestal, means for rotating said rotor, a disc freely rotatable on said pedestal above said rotor and secured to said rotor, embracing means on said disc, a movable cam on said pedestal above said disc, an element dependingly carried by said cam and movable into and out of engagement with said embracing means on said disc to thereby couple and uncouple said rotor to said cam, means biasing said element toward the position of engagement with said embracing means on said disc, movable means on said pedestal intermediate said disc and said cam and engageable with the under surface of said element to thereby lift said element out of engagement with said embracing means and uncouple said rotor and said cam, a pair of movable jaws carried by said base above said cam, said jaws being movable to and from open and closed positions and being adapted in said open position to receive a partially-wrapped comestible and an adjacent portion of the mounting stick therebetween and in said closed position to compress portions of a comestible wrapper about said adjacent stick portion, means operatively coupling said jaws to said cam for a wrapping cycle wherein said jaws are moved from said open position to said closed position and back to said open position in one revolution of said cam with said rotor, said cam having an upper surface formed with cam tracks, said jaws including depending cam followers operatively engaging said cam tracks, said cam tracks and followers being adapted during each cycle to move both jaws simultaneously into and out of said open and closed positions and at times to maintain said jaws in said open positions, means movable automatically in one direction for moving said movable cam to uncouple said cam and rotor at the end of each cycle, said last-named means being movable in an opposite direction by the insertion of a comestible between said jaws so as to move said element carried by said cam into engagement with the embracing means on said disc whereby to permit said means biasing said element to move the same into said operative position and couple said cam and rotor together for another wrapping cycle, feed means for feeding a wrapper across said jaws above the same, a cam follower depending from said feed means and operatively engaging one of said cam tracks, and said last-named cam follower being so offset relative to said first-named followers as to actuate said feed means only during the latter part of each cycle and while said jaws are in said open position.

6. A wrapping machine for applying a wrapper to a comestible on a stick, comprising a base including a pedestal, a rotor rotatable on said pedestal, means for rotating said rotor, a disc freely rotatable on said pedestal above said rotor and secured to said rotor, embracing means on said disc, a movable cam on said pedestal above said disc, an element dependingly carried by said cam and movable into and out of engagement with said embracing means on said disc to thereby couple and uncouple said rotor to said cam, means biasing said element toward the position of engagement with said embracing means on said disc, movable means on said pedestal intermediate said disc and said cam, and engageable with the under surface of said element to thereby lift said element out of engagement with said embracing means and uncouple said rotor and said cam, a pair of movable jaws carried by said base above said cam, said jaws being movable to and from open and closed positions and being adapted in said open position to receive a partially-wrapped comestible and an adjacent portion of the mounting stick therebetween and in said closed position to compress portions of a comestible wrapper about said adjacent stick portion, means operatively coupling said jaws to said cam for a wrapping cycle wherein said jaws are moved from said open position to said closed position and back to said open position in one revolution of said cam with said rotor, said cam having an upper surface formed with cam tracks, said jaws including depending cam followers operatively engaging said cam tracks, said cam tracks and followers being adapted during each cycle to move both jaws simultaneously into and out of said open and closed positions and at times to maintain said jaws in said open positions, means movable automatically in one direction for moving said movable cam to uncouple said cam and rotor at the end of each cycle, said last-named means being movable in an opposite direction by the insertion of a comestible between said jaws so as to move said element carried by said cam into engagement with the embracing means on said disc whereby to permit said means biasing said element to move the same into said operative position and couple said cam and rotor together for another wrapping cycle, feed means for feeding a wrapper strip across said jaws above the same, a cam follower depending from said feed means and operatively engaging one of said cam tracks, said last-named cam follower being so offset relative to said first-named followers as to actuate said feed means only during the latter part of each cycle and while said jaws are in said open position, a wrapper-severing knife carried by said frame above said wrapper strip, said knife including a cam follower, a knife-actuating cam on said disc, and said knife-actuating cam being located to engage said last-named follower after the actuating of said feed means whereby to actuate said knife to sever a wrapper from said strip just prior to the end of each cycle.

7. A wrapping machine for applying a wrapper to a comestible on a stick, comprising a base including a pedestal, a rotor rotatable on said pedestal, means for rotating said rotor, a disc freely rotatable on said pedestal above said rotor and secured to said rotor, embracing means on said disc, a movable cam on said pedestal above said disc, an element dependingly carried by said cam and movable into and out of engagement with said embracing means on said disc to thereby couple and uncouple said rotor to said cam, means biasing said element toward the position of engagement with said embracing means on said disc, movable means on said pedestal intermediate said disc and said cam and engageable with the under surface of said element to thereby lift said element out of engagement with said embracing means and uncouple said rotor and said cam, a pair of movable jaws carried by said base above said cam, said jaws being movable to and from open and closed positions and being adapted in said open position to receive a partially-wrapped comestible and an adjacent portion of the mounting stick therebetween and in said closed position to compress portions of a comestible wrapper about said adjacent stick portion, means operatively coupling said jaws to said cam for a wrapping cycle wherein said jaws are moved from said open position to said closed position and back to said open position in one revolution of said cam with said rotor, a cam plunger slidable vertically in said pedestal, said plunger including a cam surface engaging said movable element upon upward movement of said plunger from a lowered position to move said movable element to uncouple said cam and rotor, means for moving said plunger upwardly to an elevated position during each cycle so as to uncouple said cam and rotor at the end of each cycle, and said plunger being movable downwardly to said lowered position by the insertion of a comestible between said jaws so as to move said element carried by said cam into engagement with the embracing means on said disc whereby to permit said means biasing said element to move the same into said operative position and couple said cam and rotor together for another wrapping cycle.

8. A wrapping machine for applying a wrapper to a comestible and to an adjacent portion of a mounting stick mounting said comestible, comprising a frame including a platform formed with an opening, said platform being adapted to support a wrapper across said opening, said comestible being adapted to be passed through said opening with said wrapper whereby to partially wrap said comestible and adjacent portions of said mounting stick, a plunger carried by said frame axially of said opening, for movement toward and away from the same, said plunger having an end adjacent said opening and adapted to be engaged by a comestible and wrapper passed through said opening whereby to move said plunger from an advanced to a retracted position away from said platform, movable sealing jaws carried by said frame in the region of said platform, actuating means for moving said jaws to operative positions clamping portions of said wrapper about said adjacent stick portion, power-driven means carried by said frame, coupling means for coupling and uncoupling said power-driven means to said actuating means for said jaws, means operatively associated with said plunger for actuating said coupling to couple said power-driven means and actuating means, means for thereafter advancing said plunger to said advanced position, and said means operatively associated with said plunger being operative to uncouple said power-driven means and actuating means upon said return of said plunger to said advanced position.

9. In a wrapping machine of the type wherein a comestible together with an adjacent portion of a stick mounting the same are adapted to depress a comestible wrapper between opposed jaws to partially wrap the comestible, said jaws being relatively movable thereafter through a cycle to first compress said wrapper about said adjacent portion of said stick and thereafter release the same to permit withdrawal of the wrapped comestible, the improvement comprising cam followers fixed to said jaws, a rotatable cam operatively engaging said followers to actuate said jaws through successive cycles upon rotation of said cam, a constantly-driven rotor, coupling means for coupling said cam and rotor together during each cycle, a plunger adapted to be engaged and depressed from an elevated to a depressed position by a comestible passed between said jaws, coupling actuating means actuated by the depression of said plunger and operatively associated with said coupling to actuate the latter to couple said cam and rotor to initiate a cycle, means operatively connecting said plunger to said rotor for elevating said plunger and comestible at the conclusion of each cycle, and said means actuating said coupling-actuating means being operative to uncouple said cam and rotor upon elevation of said plunger.

10. In a wrapping machine of the type wherein a comestible together with an adjacent portion of a stick mounting the same are adapted to depress a comestible wrapper between opposed jaws to partially wrap the comestible, said jaws being relatively movable thereafter through a cycle to first compress said wrapper about said adjacent portion of said stick and thereafter release the same to permit withdrawal of the wrapped comestible, the improvement comprising cam followers fixed to said jaws, a rotatable cam operatively engaging said followers to actuate said jaws through successive cycles upon rotation of said cam, a constantly-driven rotor, coupling means for coupling said cam and rotor together during each cycle, a plunger adapted to be engaged and depressed from an elevated to a depressed position by a comestible passed between said jaws, coupling-actuating means actuated by the depression of said plunger and operatively associated with said coupling to actuate the latter to couple said cam and rotor to initiate a cycle, means operatively connecting said plunger to said rotor for elevating said plunger and comestible at the conclusion of each cycle, said means actuating said coupling-actuating means being operative to uncouple said cam and rotor upon elevation of said plunger, and means for heating said jaws whereby to heat-seal said wrapper about said adjacent portion of said stick.

11. In a wrapping machine of the type wherein a comestible together with an adjacent portion of a stick mounting the same are adapted to depress a comestible wrapper between opposed jaws to partially wrap the comestible, said jaws being relatively movable thereafter through a cycle to first compress said wrapper about said adjacent portion of said stick and thereafter release the same to permit withdrawal of the wrapped comestible, the improvement comprising cam followers fixed to said jaws, a rotatable cam operatively engaging said followers to actuate said jaws through successive cycles upon rotation of said cam, a constantly-driven rotor, said rotor being formed with an annular series of latch detents in facing relation to said cam, a latch dog pivoted on said cam and normally engaging one of said detents whereby to couple said rotor and cam together, a plunger adapted to be engaged and depressed from an elevated to a depressed position by a comestible passed between said jaws, a mounting means mounting said rotor, cam and plunger, a latch lifter pivoted on said mounting means, means biasing said lifter out of engagement with said latch dog, a cam surface on said plunger and engageable with said lifter to actuate the later to lift said latch dog and uncouple said cam and rotor after said plunger reaches said elevated position, a cam surface on said cam and a cam follower on said plunger, and said last-named cam surface and follower being operative to elevate said plunger from said depressed position to said elevated position whereby to terminate each cycle.

12. In a wrapping machine of the type wherein a comestible together with an adjacent portion of a stick mounting the same are adapted to depress a comestible wrapper between opposed jaws to partially wrap the comestible, said jaws being relatively movable thereafter through a cycle to first compress said wrapper about said adjacent portion of said stick and thereafter release the same to permit withdrawal of the wrapped comestible, the improvement comprising cam followers fixed to said jaws, a rotatable cam operatively engaging said followers to actuate said jaws through successive cycles upon rotation of said cam, a constantly-driven rotor, said rotor being formed with an annular series of latch detents in facing relation to said cam, a latch dog pivoted on said cam and normally engaging one of said detents whereby to couple said rotor and cam together, a plunger adapted to be engaged and depressed from an elevated to a depressed position by a comestible passed between said jaws, a mounting means mounting said rotor, cam and plunger, a latch lifter pivoted on said mounting means, means biasing said lifter out of engagement with said latch dog, a cam surface on said plunger and engageable with said lifter to actuate the latter to lift said latch dog and uncouple said cam and rotor after said plunger reaches said elevated position, a cam surface on said cam and a cam follower on said plunger, said last-named cam surface and follower being operative to elevate said plunger from said depressed position to said elevated position whereby to terminate each cycle, and means for heating said jaws whereby to heat-seal said wrapper about said adjacent portion of said stick.

HENRY J. WAHLERS.

REFERENCES CITED

The following references are of record in the file of this patent:

UNITED STATES PATENTS

| Number | Name | Date |
|---|---|---|
| 2,257,463 | Goodwyn | Sept. 30, 1941 |